July 1, 1924.

M. MATHIEU 1,499,623

AUTOMATIC WEIGHING APPARATUS

Filed May 7, 1921  3 Sheets-Sheet 1

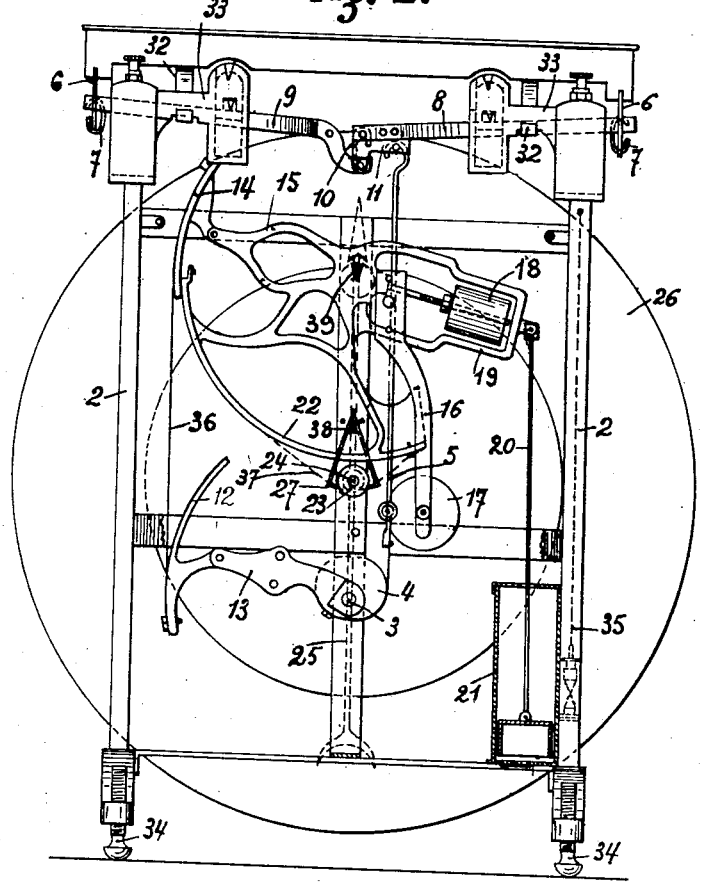

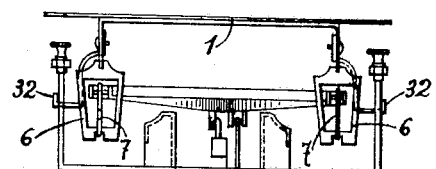
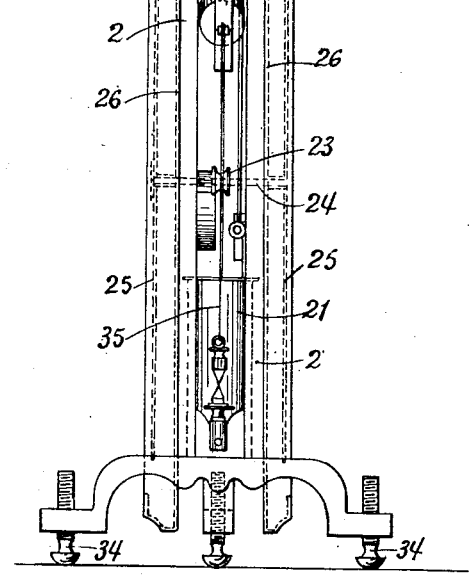
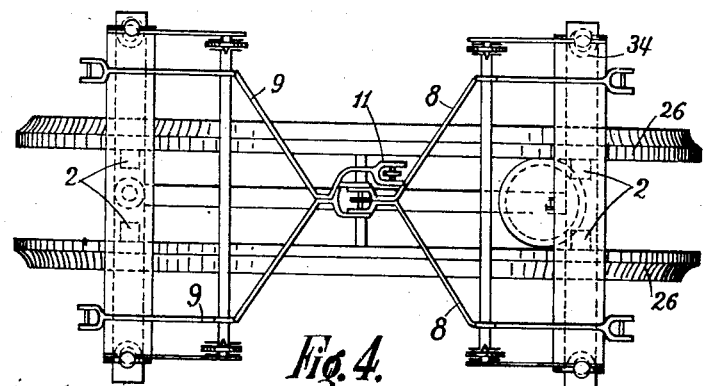

Patented July 1, 1924.

1,499,623

UNITED STATES PATENT OFFICE.

MARIUS MATHIEU, OF PARIS, FRANCE.

AUTOMATIC WEIGHING APPARATUS.

Application filed May 7, 1921. Serial No. 467,752.

*To all whom it may concern:*

Be it known that I, MARIUS MATHIEU, a citizen of the French Republic, residing at Paris, France, have invented certain new and useful Improvements in Automatic Weighing Apparatus, of which the following is a specification.

This invention relates to a weighing apparatus with two dials in which the scale pan is arranged above said dials. This weighing apparatus is based as far as the theory of its working is concerned, upon the essential principles well known by themselves. This weighing apparatus is characterized by the arrangements which permit to realize a commercial weighing apparatus which is very sensitive and fulfills all requirements of practical use.

In the accompanying drawings the improved weighing apparatus is shown by way of example.

Fig. 2 is a front elevation, the front dial being removed.

Fig. 3 is a side view seen from the side of the plumb line.

Fig. 4 is a plan view, the scale pan being removed, only the lever system for supporting said scale, the frame and the dials being shown.

Figure 1:
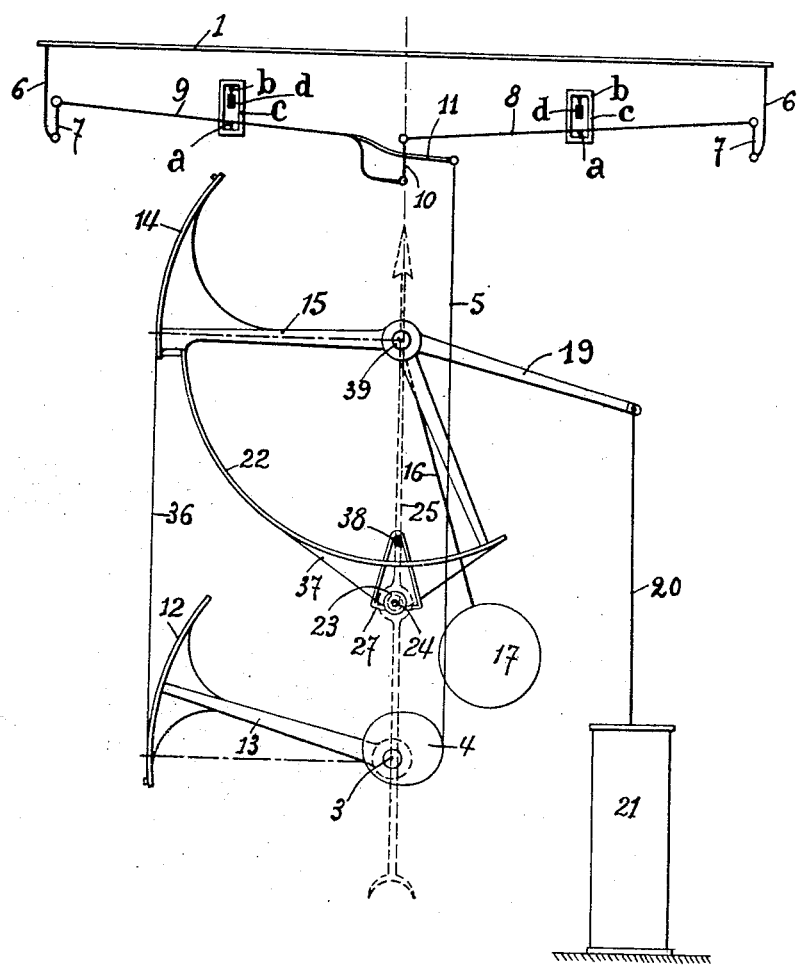
Fig. 1 is a diagram which shows, without all the details of construction, the essential organs of the apparatus which cooperate to the general working.

The weighing apparatus which forms the object of this invention is based upon the principle of the rectified load-balancing pendulum lever through the use of a cam the curve of which is determined according to the well known theoretic considerations and it is essentially characterized by the fact that the action upon this cam resulting from the load placed upon the scale pan acts from above upwards.

This weighing apparatus comprises a scale pan 1 mounted above the frame 2 on which all the organs of the apparatus are mounted. The cam 4 with its rectifying curve is keyed upon an axle 3 mounted in the said frame in any convenient manner. To said cam the metal band 5 is attached and partly wound around the same. This band 5 is conducted vertically upwards to the lever system which supports the scale pan. This scale pan is supported in the following manner:—

At the ends of the same lugs 6—6 are secured which are connected by means of suspension hooks 7—7 to the outer ends of levers 8—9 adapted to oscillate upon their knife edges *a, a* which bear upon connecting pieces *c—c* suspended by means of knife edges *b—b* upon fixed bearings *d—d* situated at equal distance from the axis of the apparatus. The levers 8, 9 of which one, the lever 9, is bent at the end are connected at their inner ends the one with the other by means of a ring 10, said lever 9 having an extension 11 to which the metal band 5 is attached which with its other end is fixed to the rectifying cam 4.

This lever system which is interconnected and has outer bearing points permits of supporting the scale pan at its outer ends so that it cannot tilt.

Upon the axle 3 of the cam 4 an oscillating arm 13 is keyed which carries the circular segments 12 connected through a metal band 36 with the corresponding circular segment 14 of the oscillating arm 15 keyed upon the axle 39 of the beam. Upon the same axle 39 the lever 16 is keyed which extends downward and carries at its lower end the counterweight 17 of the beam. The turning movements of the counterweight serve to balance the effects of the load.

It is evident that the load placed upon the scale pan 1 causes the lever system to oscillate upon the knife edges *a, a* whereby the arm 11 of the lever 9 is raised and acts through the intermediary of the band 5 from above upwards upon the cam 4. Herefrom follows that the segment 12 which is rigidly connected with said cam descends and draws along for a corresponding distance the segment 14 with which it is connected so that the axle 39 revolves and makes the lever 16 swing so that it lifts the counterweight 17 out of its normal position until the turning moment corresponding to the position of this counterweight stabilizes the efforts resulting from the load. The different parts remain now in their equilibrated positions. The upper oscillating arm 15 carries at its inner end an arm 19 upon which a weight 18 is movably mounted. The position of this weight can be regulated and it is designed to equilibrate all the organs.

The segments 12 and 14 being circular and concentric to their respective axis of rotation and connected the one with the other through the band 36, the effects from the load are transmitted to the upper mechanism and the weighing apparatus acts with regard to the effects of this load as if the rectifying cam 4 was mounted upon the axle of this upper mechanism. These two segments 12 and 14 which change nothing in the theory of the load-balancing pendulum lever form a practical means of correction, as it is sufficient for this purpose to remove material either from the one or from the other of said segments according to the sense of the error indicated on the dial.

The arm 19 mounted up the axle 39 is connected through a rod 20 with a piston of an air brake 21 designed to regulate and to stabilize the movements of the apparatus.

A segment 22 is arranged in proximity of or in alignment with the segment 14, a chain 37 attached to said segment 22 acting upon a small pulley 23 mounted upon the axle 24 of the hands 25, the oscillations of the oscillating arm 15 being thus transmitted to said hands in being amplified.

The axle 24 of said hands rests upon the two bridges 27 which have the form of circular segments and which are suspended upon knife edges 38 so that said axle rolls upon these bridges which it draws along, any friction which could unfavorably influence the sensitiveness of the apparatus being thus avoided.

The frame 2, of narraw form and arranged below the scale pan, is closed by two dials 26, 26 so that no special casing is required. This frame carries all the parts of the mechanism and, owing to its form and its arrangement it facilitates the mounting and dismounting in reducing at the same time the cost of manufacture.

Upon the gallery which crowns the frame adjustable knobs 31 are arranged which serve as abutments for the scale pan and limit the downward movement of said scale pan so that a load of any weight can be placed upon the scale pan without spoiling the mechanism. On the other hand the scale has hooks 32 which engage with said gallery so that they can strike against the lower edge of said gallery when the apparatus is being lifted by the scale pan. The feet of the frame have adjustable screws 34 and the apparatus is further fitted with a plumb line 35 so that the weighing apparatus can be easily regulated so that the hand points to zero.

I claim:—

1. An automatic weighing apparatus comprising in combination a frame, a scale pan above said frame, lugs one at each end of the scale pan, suspension hooks in said lugs, two supporting levers oscillably mounted in said frame and supporting on their ends said scale pan, a link connecting the inner ends of said oscillating levers, an axle journaled in said frame, a cam having a rectifying curve keyed on said axle, a metal band attached with one end to said rectifying cam and partly wound around the same and means connecting said band with the other end to said system of supporting levers, an oscillating arm keyed on said axle of the rectifying cam, a beam, an axle for oscillably mounting said beam in said frame, an oscillating arm keyed on the axle of said beam, a circular segment at the end of said oscillating arm on the beam axle, a metal band attached with one end to said circular segment on which it is guided and attached with the other end to the oscillating arm of the axle of the rectifying cam, and a downwardly extending lever for said beam axle and a counterweight on the end of said lever for balancing said beam.

2. An automatic weighing apparatus comprising in combination a frame, a scale pan above said frame, lugs one at each end of the scale pan, suspension hooks in said lugs, two supporting levers oscillably mounted in said frame and supporting on their ends said scale pan, a link connecting the inner ends of said oscillating levers, an axle journaled in said frame, a cam having a rectifying curve keyed on said axle, a metal band attached with one end to said rectifying cam and partly wound around the same and means connecting said band with the other end to said system of supporting levers, an oscillating arm keyed on said axle of the rectifying cam, a beam, an axle for oscillably mounting said beam in said frame, an oscillating arm keyed on the axle of said beam, a circular segment at the end of said oscillating arm on the beam axle, a metal band attached with one end to said circular segment on which it is guided and attached with the other end to the oscillating arm of the axle of the rectifying cam, a downwardly extending lever for said beam axle, a counterweight on the end of said lever for balancing said beam, two adjustable stops on the upper edge of said frame designed to limit the descent of the scale pan and hooks on the scale pan serving as handles.

3. An automatic weighing apparatus comprising in combination a frame, a scale pan above said frame, lugs one at each end of the scale pan, suspension hooks in said lugs, two supporting levers oscillably mounted in said frame and supporting on their ends said scale pan, a link connecting the inner ends of said oscillating levers, and axle journaled in said frame, a cam having a rectifying curve keyed on said axle, a metal band attached with one end to said rectifying cam and partly wound around the same and means connecting said band with the other end to said system of supporting levers, an oscillating arm keyed on said axle of the rectifying cam, a beam, an axle for oscillably mounting said beam in said frame, an oscillating arm keyed on the axle of said beam, a circular segment at the end of said oscillating arm on the beam axle, a metal band attached with one end to said circular segment on which it is guided and attached with the other end to the oscillating arm of the axle of the rectifying cam, and a downwardly extending lever for said beam axle, a counterweight on the end of said lever for balancing said beam, two adjustable stops on the upper edge of said frame designed to limit the descent of the scale pan and hooks on the scale pan serving as handles, a sector made in one piece with said lever extending from the beam axle, two dials in said frame, an axle journaled in said dials, two hands on the outer ends of said axle, a small pulley on said axle of the hands, a small chain attached with one end to said sector and with the other end to said small pulley and two sector-shaped bridges resting on knife edges serving as support for said axle of the hands.

In testimony whereof I affix my signature in presence of two witnesses.

MARIUS MATHIEU.

Witnesses:
HENRI BLOUIN,
ANDRI BLOUIN.